United States Patent [19]

Kerr et al.

[11] Patent Number: 4,473,768
[45] Date of Patent: Sep. 25, 1984

[54] PIEZOELECTRIC FORCE-BALANCE ACCELEROMETER SYSTEM

[75] Inventors: James D. Kerr, Allen; Howard Thompson, Dallas, both of Tex.

[73] Assignee: Teledyne Industries, Inc., Los Angeles, Calif.

[21] Appl. No.: 537,756

[22] Filed: Sep. 30, 1983

[51] Int. Cl.³ .............................................. H01L 41/08
[52] U.S. Cl. ................................. 310/329; 73/517 B; 310/319; 310/330
[58] Field of Search ............... 310/329, 330, 314, 319; 73/517 R, 517 B, DIG. 4

[56] References Cited

U.S. PATENT DOCUMENTS 3,120,622  2/1964  Dranetz et al. ..................... 310/329
3,229,531  1/1966  Stiles .
4,186,324  1/1980  Hartzell, Jr. .

Primary Examiner—Mark O. Budd
Attorney, Agent, or Firm—Dowell & Dowell

[57] ABSTRACT

A strong-motion force-balance accelerometer system responsive to accelerations along the axis of its housing, and having an annular diaphragm fixed with respect to the housing normal to the axis, the diaphragm having a winding extending around the periphery of the diaphragm and forming with the diaphragm the proof mass of the accelerometer system, a transducer disc fixed to the surface of the diaphragm and operative to flex with the diaphragm and generate a voltage in response to displacement thereof, a magnetic flux path having an annular flux gap around the periphery of the diaphragm, the gap being occupied by the winding, and an amplifier circuit including a forward amplifier connected to receive the voltage generated by the transducer disc and to deliver an output signal in response to displacement of the diaphragm and the circuit including a feed back amplifier connected to said output signal and operative to feed back current to the winding tending to opposed displacement of the diaphragm.

9 Claims, 4 Drawing Figures

PIEZOELECTRIC FORCE-BALANCE ACCELEROMETER SYSTEM

BACKGROUND AND PRIOR ART

This invention relates to an accelerometer structure and force-balance feedback system for measuring strong-motion seismic events, and is particularly useful for measuring earthquake vibrations in buildings, bridges and other structures, such vibrations being substantially within a frequency band of 0.1 Hz to 50 Hz, and having amplitude levels up to about 5G peak.

Force-balance accelerometers and seismometers are well known in the art, and generally are of the type which produces a signal proportional to displacement of a proof mass and then feeds back components of the signal to a winding to at least partially oppose such displacement. A few of them have used a combination of a piezoelectric or ferroelectric transducer to generate the signal and a winding to which components the signal are fed back.

U.S. Pat. No. 4,186,324 to Hartzell suggests this general concept by showing a piezoelectric transducer means 10 and a torque coil 14, both carried by a bendable arm which cooperates with a position detector. It is the function of the position detector plus the piezoelectric transducer to deliver error signals to an amplifier system that generates a restorative current and delivers it to the torque coil to return the mass to an initial null position. The structure of the accelerometer and the electrical circuitry however are different from the present invention and lack certain advantages that will be set forth below.

U.S. Pat. No. 3,229,531 to Stiles employs piezoresistive elements connected in series with a battery to modulate a current through a coil in a force-balance accelerometer to provide its restoring force. However, this arrangement draws current continuously from the battery and therefore would not be acceptable for use in an accelerometer that must wait for seismic events over long periods of time in an isolated location where low power drain is vitally important.

THE INVENTION

This invention comprises an improved force-balance accelerometer construction in which the housing of the unit comprises a magnetic cup and contains a magnet and an annular flux gap occupied by a winding supported on the outer periphery of a flexible diaphragm which is in turn rigidly supported at its center with respect to the housing so that the winding is positioned in the flux gap and is axially moveable therein by flexure of the diaphragm. One surface of the diaghragm has a piezoelectric or ferroelectric transducer disc bonded to it so that flexure displacement of the diaphragm distorts the transducer disc and generates a voltage proportional to such displacement. The winding and the diaphragm and the transducer comprise the proof mass of the accelerometer. The unit is sealed and has feed-through electrical terminals bringing out the leads from the transducer and the winding. The output of the transducer passes through a forward amplifier to an output terminal which delivers the output signal of the system, and components of this signal are connected to the input of a feedback amplifier. The output of the feedback amplifier drives the winding with a force-balance signal. One input signal component to the feedback amplifier is capacitively coupled from the forward amplifier so that this component is proportional to proof mass velocity and therefore produces a damping component of the feedback current, and the other input component to the feedback amplifier is resistively coupled from the forward amplifier to produce a current that is proportional to diaphragm displacement and is therefore in the nature of a position-restoring spring force. A calibration signal can also be introduced into the feedback amplifier to initially displace the proof mass for test purposes in a manner known per se.

OBJECTS AND ADVANTAGES

It is a principal object of this invention to provide an improved accelerometer and force-balance accelerometer system which is inexpensive to manufacture and which requires minimal power supply capability, the system being useful as a strong motion accelerometer for measuring the motions of buildings, bridges, and other structures in response to earthquake events.

Another object of the invention is to provide an improved force-balance accelerometer incorporating a piezoelectric or ferroelectric transducer in combination with a feedback winding to provide a novel proof mass assembly wherein the accelerometer requires no outside source of power, such as a bridge excitation circuit since the present transducer is self-generating to provide a signal which is proportional to displacement of the seismic or proof mass.

Another major object of the invention is to provide a force-balance accelerometer system in which there are two input components to the feedback amplifier which drive the winding with signal from the transducer, one component being proportional to velocity of the proof mass and therefore acting as a damping force, and the other input being proportional to displacement of the mass and therefore acting as a position-restoring force.

It is a principal object of the invention to provide an accelerometer system having feedback amplifier means as set forth above wherein the capacitively-coupled component of input serves to control and limit the response of the accelerometer at its closed loop natural resonant frequency, and wherein the resistively-coupled component of input provides a restoring spring force whose magnitude can be combined with the mechanical spring force of the diaphragm and used to adjust the natural frequency of the accelerometer mass when the feedback loop is closed. The advantage of this arrangement is that all adjustments of closed-loop damping ratio and of closed-loop spring rate and therefore the natural frequency of the accelerometer can be made by adjusting passive electrical components exteriorly of the accelerometer unit itself, which can therefore be sealed. Since the closed loop sensitivity of the accelerometer system is a function primarily of low temperature-coefficient passive feedback electrical components, it is not primarily determined by the sensitivity of the ceramic transducer element, which element has a large temperature coefficient that would derrogate from the accuracy of the accelerometer unit if used in an open loop configuration. In the closed loop configuration, the feedback loop characerics minimize the effect of the temperature coefficient of the transducer element.

A further major advantage of the present accelerometer system is that, since the piezoelectric or ferroelectric transducer is by its nature AC coupled to the forward amplifier, there is no steady-state DC component of output from the accelerometer unit, and therefore the over-all accelerometer system is independent of gravity effects upon the proof mass, whereby the system output does not include a component responsive to tilt. As a result, the accelerometer can be used in any orientation, i.e. vertical or horizontal, or any other position of the axis, and can be so oriented without requiring any adjustments of the system. Unlike the present system wherein no steady state component of output is generated based upon axial orientation of the accelerometer unit, in most prior art systems with DC coupled displacement transducers, the system continuously draws a current through the feedback coil, or else requires some adjustment to be made to compensate the effect of gravity for each different position of its axis or for drift of the electrical circuit components.

It is a corollary object of the invention to provide an accelerometer system for use with a strong-motion recorder wherein the accelerometer units need not be accurately leveled, and wherein the same type of system can be used to sense components of motion along various geometric axes.

A further object of the invention is to provide a system having a convenient circuit point at which to inject a calibration signal into the winding to displace the proof mass and thus test the response of the entire accelerometer system and any external transmission and recording system to which it is connected. Injection of a stable calibration signal to deflect the proof mass results results in a repeatable and meaningful calibration of the entire system and any transmission and recording means associated therewith.

Other objects and advantages of the invention will become apparent during the following discussion of the drawings.

THE DRAWINGS

DESCRIPTION OF PREFERRED EMBODIMENT

Figure 1:
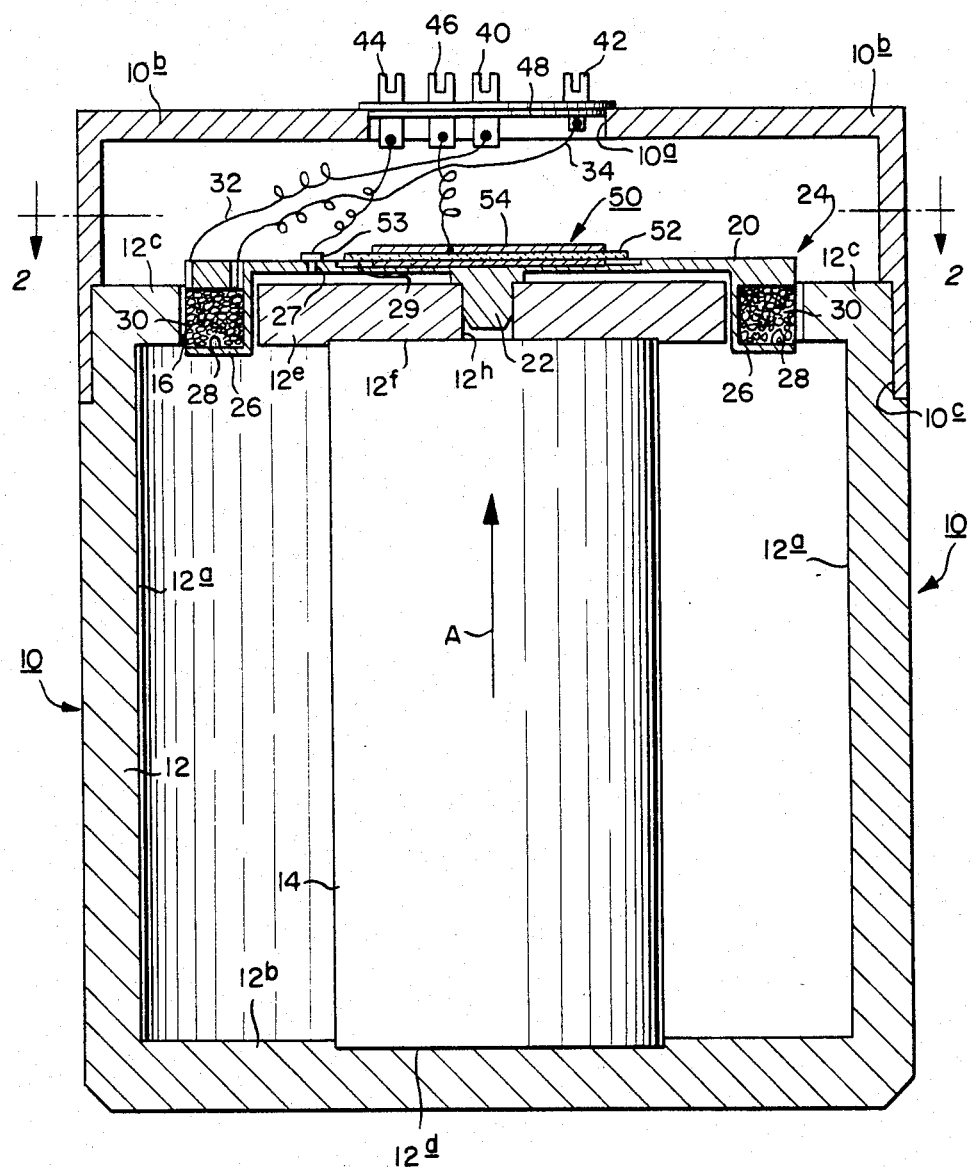
FIG. 1 is an axial sectional view taken through an accelerometer according to the present invention.
Figure 2:
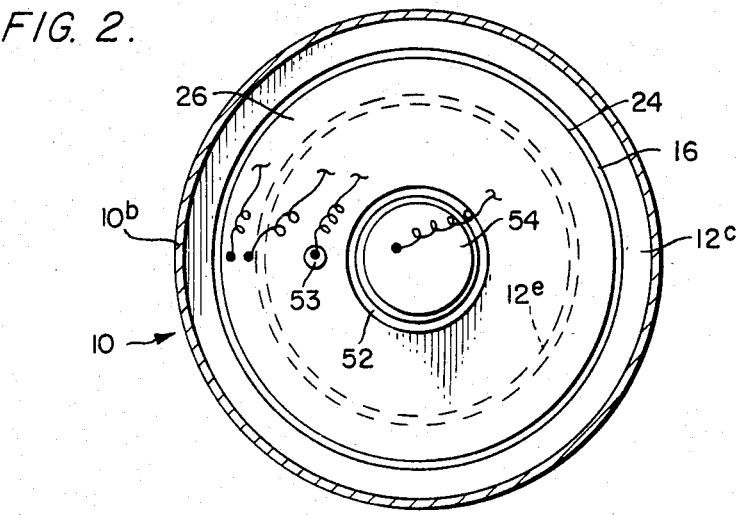
FIG. 2 is a transverse section view on a smaller scale taken along line 2—2 of FIG. 1.

Referring now to the drawings, FIG. 1 shows an accelerometer according to the invention wherein the housing 10 comprises a magnetically permeable cup 12 including side walls 12a, a bottom 12b and an upper wall 12c. The bottom 12b is recessed at 12d to receive a magnet 14 which supports at its upper end a pole piece 12e which is recessed at 12f to sit on the magnet 14. The magnet is suitably bonded at its ends to the members 12b and 12e. As can best be seen in FIG. 2, the upper wall 12c and the pole piece 12e are shaped to provide an annular flux gap 16 between them in which the flux of the magnet 14 is concentrated by the magnetic core members 12a, 12b, 12c, and 12e.

A proof mass assembly overlies the pole piece 12e, and comprises a thin flexible diaphragm 20 in the form of an aluminum disc having a stud 22 extending downwardly from its center and pressed into a hole 12h in the center of the pole piece, whereby the stud 22 and the diaphragm 20 are fixed with respect to the pole piece 12e and the magnet 14, and therefore fixed with respect to the housing 10. The diaphragm 20, being thin and flexible, can flex at locations which are radially beyond the stud so that the outer periphery 24 of the diaphragm can be displaced parallel to the axis A of the housing 10 when the latter is subjected to axial seismic accelerations.

The outer periphery of the diaphragm 20 in the vicinity of the reference character 26 is thickened axially to provide a winding supporting portion which fully occupies the height of the flux gap 16, the portion being provided with a groove 28 in which a winding 30 of fine insulated wire is supported. In the currently manufactured embodiment of the structure the winding has about 650 turns of No. 39 AWG wire held in place by cured resin. Leads 32 and 34 from the winding 30 are soldered to feed-through terminals 40 and 42 supported on insulation 48 carried in an opening 10a in the cover 10b of the housing 10 which can be appropriately sealed to the housing where it fits in an annular groove 10c.

Figure 3:
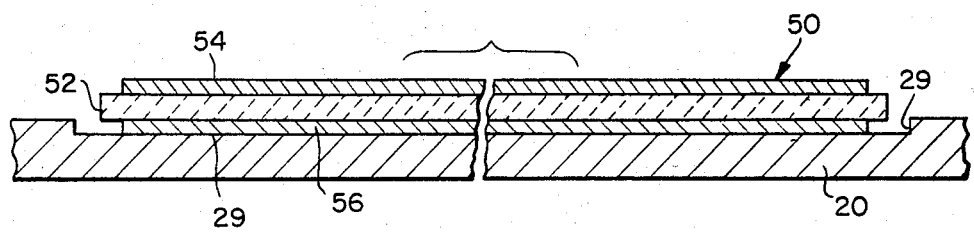
FIG. 3 is an enlarged partial sectional view of the transducer member mounted on the diaphragm shown in FIG. 1.

As can be seen best in FIG. 3, the diaphragm 20 has an upper surface with a recess 29 into which is set and cemented a piezoelectric or ferroelectric transducer 50 comprising a ceramic element 52 having upper and lower electrodes 54 and 56 bonded thereto as is well known in the art, the ceramic element and electrodes comprising a self generating transducer which is widely used in seismic work. The lower electrode 56 is cemented to the upper surface of the recess 29 with conductive cement (not shown), and as shown in FIG. 1, a solder lug 53 is pressed into a hole 27 in the diaphragm and is connected by a wire to the feed-through terminal 44 in the cover 10b. The other electrode 54 of the transducer 50 is connected by a wire soldered to it and to the other feed-through terminal 46.

The diaphragm including the winding supporting portion 26, the winding 30, and the transducer 50 comprise the seismic or proof mass of the accelerometer. One feature of this invention is that no mechanical adjustments and no physical tuning of the resonance characteristic of the accelerometer unit itself need be made at the time of manufacture, whereby the cost of the unit is minimized. The overall size of the accelerometer as currently manufactured is 2.125" in axial length by 1.75" in diameter.

Figure 4:
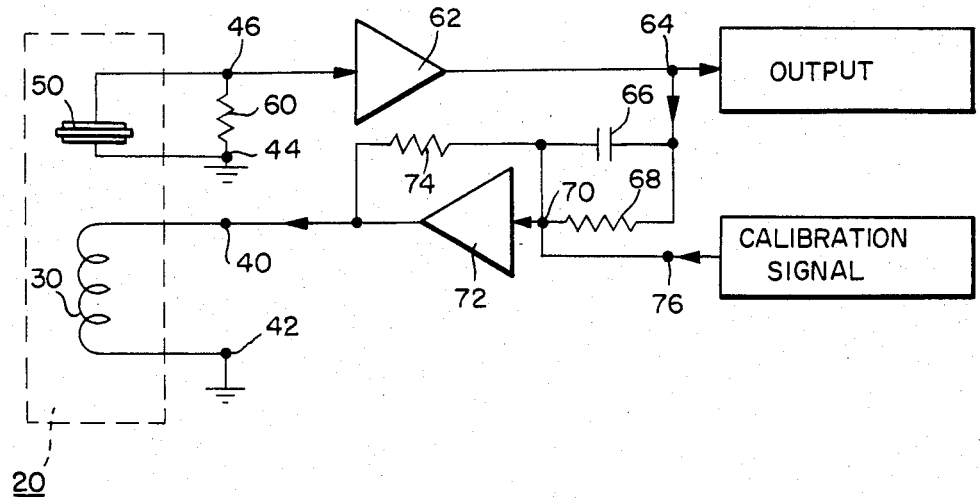
FIG. 4 is a schematic electrical diagram showing the wiring of an accelerometer system according to the present invention.

Referring now to FIG. 4, the diaphragm 20 is shown schematically in dotted lines, and the terminals 40, 42, 44 and 46 are repeated from FIG. 1 and shown appropriately connected to the winding 30 and to the ceramic transducer 50, which could be shown schematically as an equivalent circuit comprising a capacitor and a generator coupled thereto in place of the illustrated piezoelectric transducer. One side of the transducer 50 is grounded at terminal 44, and the other side delivers a self-generated voltage at terminal 46. The transducer, being in effect a self-charging capacitor, when the diaphragm 20 flexes the transducer charges its self-capacitance. However, any steady state charge on the transducer is bled off by the resistor 60. Therefore, at frequencies below the cut-off frequency as determined by the self capacitance of the transducer and the resistor 60, the amplifier circuit does not respond to flexure of the diaphragm and the transducer. At frequencies above this cut-off frequency, the transducer drives the input of a forward amplifier 62 which delivers an output signal to the terminal 64, this signal comprising the main output of the accelerometer system.

Another way of achieving suppression of a steady-state charge on the transducer caused by gravitational effects is to substitute a "charge amplifier" in place of the amplifier 62, the charge amplifier being well known for use in instrumentation systems and comprising an operational amplifier having both capacitive and resistive feedback across it so that the amplifier feeds back a current to the feedback capacitance to generate therein a charge which is equal to the charge generated within the transducer, this charge being maintained in the feedback capacitance to produce a higher voltage at the output of the forward amplifier 62. In such a system the gain of the forward amplifier becomes equal to the ratio of self capacitance of the transducer and the feedback capacitance.

The output signal 64 from the forward amplifier is also connected to a feedback capacitor 66 and to a feedback resistor 68 which are respectively coupled via the input terminal 70 to a feedback amplifier 72 which drives the winding 30 through the terminal 40. The other side of the winding is grounded through the terminal 42. The gain of the feedback amplifier is fixed at an appropriate level by the feedback resistor 74.

The feedback amplifier input 70 thus receives two components of the main signal output. One component is a resistively-coupled component entering the amplifier 72 through the resistor 68, which component is proportional to the displacement of the diaphragm and therefore produces a component of current from the amplifier 72 through the terminal 40, which component in the winding 30 produces a restoring spring force which when combined with the mechanical spring force of the diaphragm 30 itself can be used to adjust the natural resonant frequency of the proof mass when the feedback loop is closed. The other component is a capacitively-coupled component entering the feedback amplifier 72 through the capacitor 66, which component is proportional to the velocity of the winding 30 when displaced axially of the flux gap 16 and therefore produces a feedback component of current from the amplifier 72 entering the winding 30 through the terminal 40, which component in the winding 30 produces a damping force which limits or controls the response of the accelerometer proof mass at its closed-loop resonant frequency.

A calibration pulse signal of stable magnitude and pulse shape can be introduced at the terminal 76 to insert a known proof-mass disturbing signal through the feedback amplifier 72 into the winding at terminal 40. Such a calibration signal causes the proof mass to be displaced through a "standard" deflection, and when the calibration pulse disappears, the proof mass responds to its deflection as though a seismic event had accelerated the housing 10, whereupon the response of the entire system to a disturbance of known magnitude and direction can be checked.

This invention is not to be limited to the exact embodiment shown in the drawings for obviously changes may be made within the scope of the following claims.

We claim:

1. A strong-motion force-balance accelerometer system responsive to accelerations along a displacement axis; comprising:
   (a) an accelerometer housing having an axis disposed along said displacement axis and having a magnetic field generating means;
   (b) a proof mass suspended in said housing and moveable along said displacement axis;
   (c) a winding on said proof mass and disposed in said field;
   (d) a transducer cooperatively associated with said proof mass and operative to generate and deliver a voltage which is proportional to displacement of the proof mass; and
   (e) amplifier means including a forward amplifier connected to receive the voltage generated by the transducer and to deliver an output signal in response to displacement of the proof mass, and including a feedback amplifier having resistive means coupling it to said output signal to receive a component thereof which is proportional to displacement position of said proof mass and having capacitive means coupling it to said output signal to receive a component thereof which is proportional to velocity of the proof mass, and the feedback amplifier being operative in response to said components to feed back currents to the winding operative to produce a position restoring spring force on the proof mass and to produce a damping force on the proof mass in response to displacement thereof.

2. An accelerometer system as claimed in claim 1, wherein the housing is sealed and has connections feeding therethrough from the transducer and winding, and wherein the amplifier means are located externally of the housing and control the natural frequency and damping of the proof mass by adjustment of the resistive and capacitive coupling means.

3. An accelerometer system as claimed in claim 1, wherein said proof mass has flexible support means supporting it in said housing, and said transducer comprises self-generating ceramic transducer means fixed to said flexible support means to flex therewith and operative to generate a voltage proportional to flexure thereof.

4. An accelerometer system as claimed in claim 3, wherein said transducer means comprises piezoelectric means.

5. An accelerometer system as claimed in claim 3, wherein said transducer means comprises ferroelectric means.

6. A strong-motion force-balance accelerometer system responsive to accelerations along a displacement axis; comprising:
   (a) an accelerometer housing having an axis disposed along said displacement axis;
   (b) an annular diaphragm having a center and having a periphery, the diaphragm being disposed in the housing normal to said displacement axis and being fixed at its center with respect to said housing;
   (c) a transducer disc fixed to a surface of the diaphragm and extending from the center toward the periphery thereof and operative to flex with the diaphragm and generate a voltage in response to displacement flexure of the diaphragm;
   (d) a winding extending around said periphery, the winding and transducer disc and diaphragm comprising the proof mass of the accelerometer system;
   (e) magnet and magnetic flux path means in the housing and having an annular flux gap around the periphery of the diaphragm, the gap being occupied by the winding; and
   (f) amplifier means including a forward amplifier connected to receive the voltage generated by the transducer disc and to deliver an output signal in response to displacement flexure of the diaphragm, and including a feedback amplifier having resistive means coupling it to said output signal to receive a component thereof which is proportional to displacement position of said proof mass and having capacitive means coupling it to said output signal to receive a component thereof which is proportional to velocity of the proof mass, and the feedback amplifier being operative in response to said components to feedback currents to the winding operative to produce a position restoring spring force on the proof mass and to produce a damping force on the proof mass in response to displacement thereof.

7. An accelerometer system as claimed in claim 6, wherein the housing is sealed and has connections feeding therethrough from the transducer disc and winding, and the amplifier means are located externally of the housing and control the natural frequency and damping of the proof mass by adjustment of the resistive and capacitive coupling means.

8. An accelerometer system as claimed in claim 6, wherein said magnet comprises an elongated permanent magnet coaxially disposed in the housing, and said magnetic flux path comprises a permeable cup having side walls, a bottom and an upper wall, the magnet supporting a pole piece opposite said bottom, and the annular flux gap being located between the pole piece and the upper wall; and wherein said diaphragm comprises a flexible disc-shaped diaphragm supported at its center by the pole piece coaxially of the housing and having a thickened peripheral portion lying within the gap, the thickened portion having an annular groove around it occupied by the winding.

9. A force-balance accelerometer system, responsive to accelerations along a diaplacement axis, comprising:
  (a) an accelerometer having a housing, having a proof mass supported in the housing for displacement in the direction of said axis, having magnetic path means in the housing with a flux gap located adjacent to the proof mass, having a winding on the proof mass occupying said flux gap, and having transducer means operatively associated with the proof mass to deliver a voltage proportional to displacement of the proof mass; and
  (b) amplifier means including a forward amplifier connected to receive the voltage generated by the transducer means and to deliver an output signal in response to displacement of the proof mass, and including a feedback amplifier having resistive means coupling it to said output signal to receive a component thereof which is proportional to displacement position of said proof mass and having capacitive means coupling it to said output signal to receive a component thereof which is proportional to velocity of the proof mass, and the feedback amplifier being operative in response to said components to feed back currents to the winding operative to produce a position restoring spring force on the proof mass and to produce a damping force on the proof mass in response to displacement thereof.

* * * * *